July 9, 1935.  E. H. FISCHER  2,007,567
APPARATUS FOR MOLDING INSULATORS
Filed Nov. 21, 1934  2 Sheets-Sheet 1

WITNESSES:
Fred C. Williams
J. Fitzgerald

INVENTOR
Eugene H. Fischer
BY
ATTORNEY

July 9, 1935. E. H. FISCHER 2,007,567
APPARATUS FOR MOLDING INSULATORS
Filed Nov. 21, 1934   2 Sheets-Sheet 2
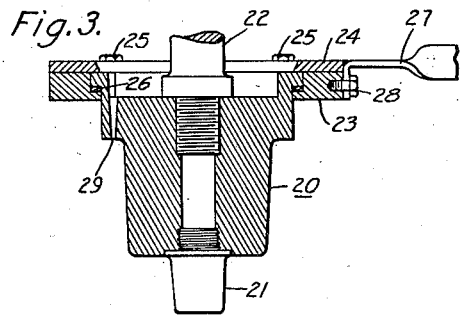
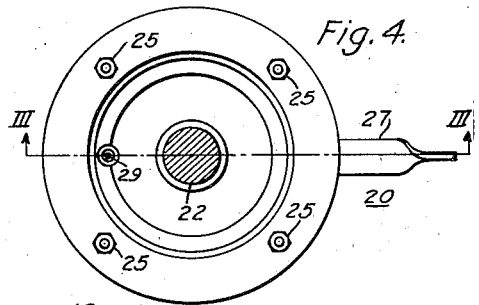
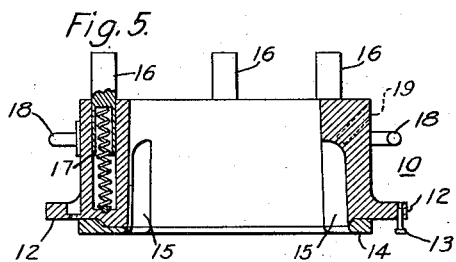
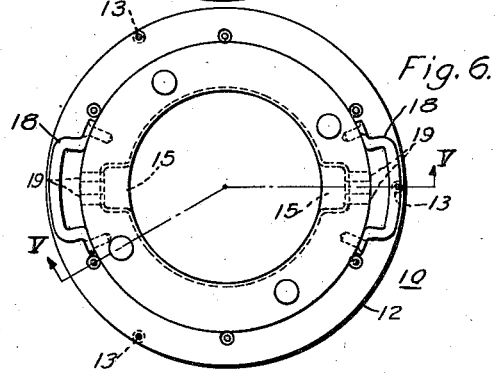
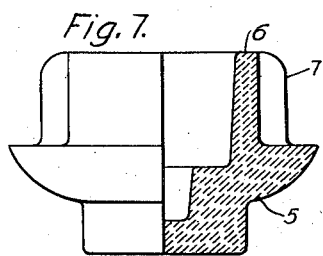
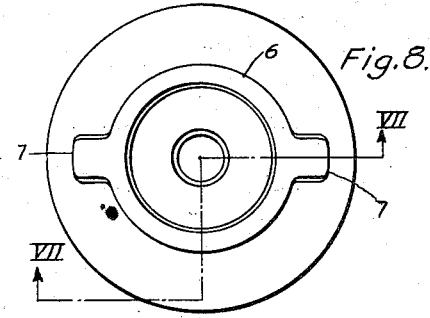
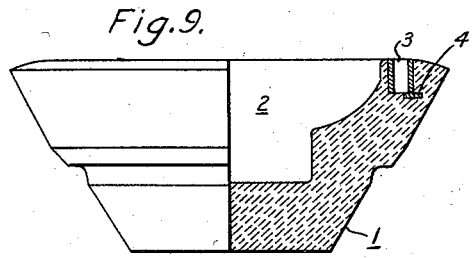
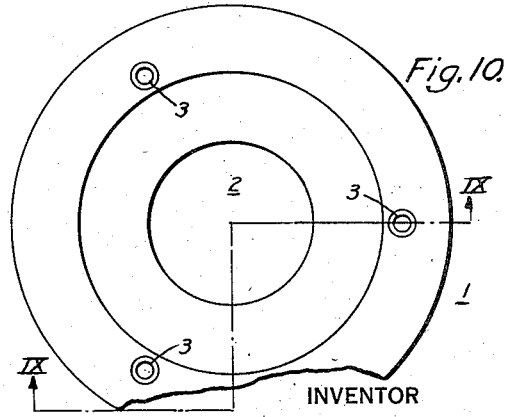
WITNESSES:
INVENTOR
Eugene H. Fischer
BY
ATTORNEY Patented July 9, 1935

2,007,567

UNITED STATES PATENT OFFICE 2,007,567

APPARATUS FOR MOLDING INSULATORS

Eugene H. Fischer, Derry, Pa., assignor to Westinghouse Electric & Manufacturing Company, East Pittsburgh, Pa., a corporation of Pennsylvania Application November 21, 1934, Serial No. 754,056

10 Claims. (Cl. 25—3)

My invention relates to improved apparatus for forming electrical insulators from plastic material, and more particularly, to a device for molding in a single operation, by the hot-pressing method, a porcelain shell having an internal surface of revolution about the major axis of the shell and an exterior surface which is irregular by reason of the provision of integral lugs, projections, or the like.

In my prior Patent, No. 1,929,737, issued October 10, 1933, the insulator molding apparatus is somewhat similar to that disclosed in the present application, in that in the patent, as here, it is desired to mold an insulator, by a single operation, having an exterior contour which is not a surface of revolution in as simple and cheap a manner as possible. Experience has shown that the use of the apparatus described in the present application is an improvement over that disclosed in the patent.

In practicing my invention, I propose to employ two superimposed mold sections for receiving the material to be molded and insert into the recess defined by said sections a rotatable die which will form a symmetrical recess in the mold material, and at the same time, force it into intimate contact with the inner wall of the mold sections, at least one of which has recesses therein for forming a lug or projection on the molded insulator. Means are provided for maintaining the mold sections in axial alignment and for exerting a pressure on the upper mold section coincident with the insertion of the rotatable die to maintain the mold sections in operative position.

Referring to the drawings:

Figs. 3 and 4 are section and top views, respectively, of the rotatable die shown in Fig. 1;

Figs. 5 and 6 are views, in section and top plan, respectively, of the upper mold section of Fig. 1;

Figs. 7 and 8 are, respectively, views in partial vertical section and top plan of the insulator blank from which the finished insulator shown in Fig. 2 is turned;

Figs. 9 and 10 are, respectively, views in partial vertical section and top plan view of the lower mold section shown in Fig. 1.

Figure 1:
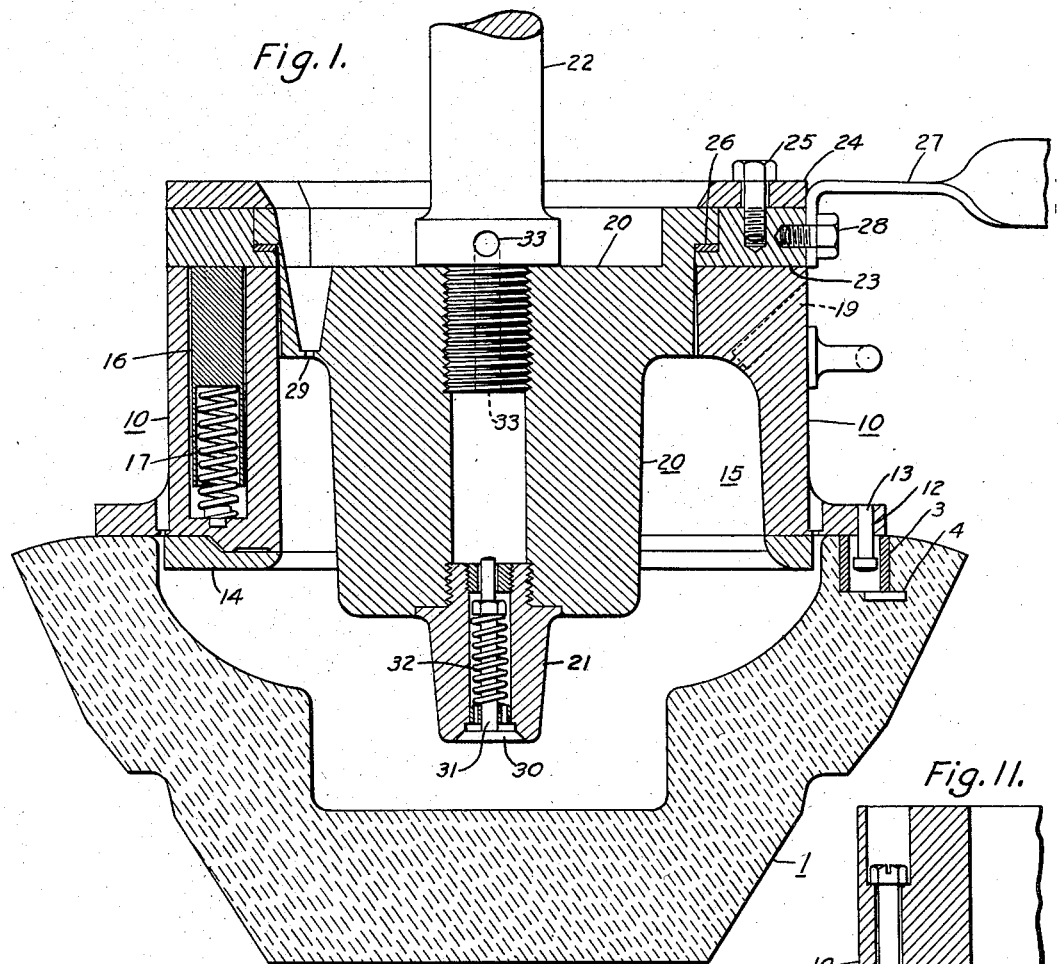
Figure 1 is a view, in vertical section, of the molding or hot-pressing apparatus embodying my invention.

Referring more specifically to the drawings, and particularly, Fig. 1 thereof, the molding apparatus comprises a moisture absorbent lower mold section 1 of plaster of Paris, or the like, an upper mold section 10, removably mounted thereon, and a rotating die 20 adapted to be inserted into the recess defined by the sections 1 and 10, to define the shape of the resulting insulator blank (shown in Figs. 7 and 8).

Figure 2:
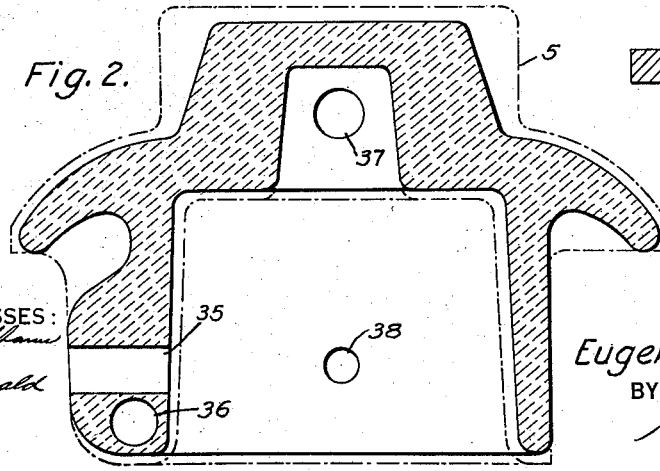
Fig. 2 is a view in vertical section, of an insulator formed by the apparatus shown in Fig. 1.

The lower mold section 1, shown more specifically in Figs. 9 and 10, comprises a relatively heavy body of plaster of Paris, or the like, having a recess 2 therein corresponding to the top portion of the insulator shown in Fig. 2. The upper face of the mold section 1, surrounding the mouth of the recess 2, constitutes a plane bearing surface for supporting the upper mold section, and has provided therein three symmetrically disposed sockets 3. Each socket comprises a short metallic sleeve embedded in the mold material with the open end thereof substantially flush with the plane upper surface of the mold. In order to anchor these sleeves in position, lugs 4 may be soldered, brazed, or otherwise secured thereto, extending into the material of the mold section. The sleeves 3 and lugs 4 are cast into the mold section when the latter is formed, and it is to be understood that other expedients may be employed to anchor the sleeves 3 in position, or, in fact, to use other means than sleeves to provide a plurality of sockets for receiving the pins 13.

Referring to Figs. 7 and 8, the insulator blank to be formed has a lower portion 5 which is symmetrical with respect to the vertical axis of the insulator, and an upper portion 6 corresponding in shape to the recess in the upper mold section 10, having formed thereon outstanding lugs 7.

Figure 11:
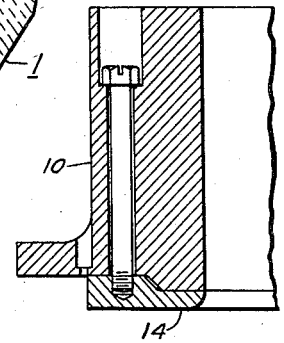
Fig. 11 is a fragmentary view in section of a detail of the upper mold section.

Referring more specifically to Fig. 5, which is taken on the line V—V of Fig. 6, the upper mold section comprises a metallic casting having a lower flange 12 proportioned to rest upon the plane upper surface of the lower mold section 1. Secured to the outer extremity of the flange 12 are three pins 13, symmetrically disposed with respect to the axis of the insulator, and proportioned to fit into the sockets 3 in the upper surface of the lower insulator section 1, to prevent relative axial movement of the two mold sections 1 and 10 when they are in operative position, as shown in Fig. 1. A ring 14 is loosely secured to the cast body of the upper section 10 below the flange 12, and, when the two mold sections are together, lies within the recess 2 of the lower mold section, as shown more clearly in Fig. 1. The means for securing the ring 14 to the main section of the mold comprises a plurality of bolts, one of which is shown in Fig. 11, extending down through the main body 10 parallel to the axis thereof and tapped into the ring portion. The length of the bolts is such that when the mold section 10 is raised the ring 14 separates therefrom a limited amount, for a purpose hereinafter described.

Recesses 15 are provided within the body portion of the section 10 to accommodate sufficient of the molding material to form the lugs 7. The interior of the mold section 10, except for the recesses 15, is a surface of revolution about the vertical axis of the section.

Four resiliently-mounted plungers 16 project from the upper face of the mold section, parallel to the vertical axis thereof, for a purpose hereinafter described. Each plunger comprises a hollow metallic rod slidably mounted in a socket 17, in the wall of the mold section 10, and is biased outwardly by means of a coil spring, as shown in detail in Fig. 5.

Two handles 18 may be bolted or otherwise suitably secured to the casting to facilitate handling thereof, as shown in Figs. 5 and 6.

Vents 19 are provided through the wall of the casting 10 communicating with the recesses 15 to permit the escape of air when pressure is applied to the molding material, so that the molding material may completely fill the recesses. Similarly, a plurality of vents are provided around the base of flange 12 communicating with the space between the ring 14 and the mold section 1.

Referring to Figs. 3 and 4, the rotatable die 20 for insertion into the mold sections 1 and 10 comprises a head portion having a projecting tip 21, suitably secured thereto, as by screw threads as shown in Fig. 3. The upper end of the head portion is in threaded engagement with a power-driven shaft 22, which may constitute part of a press of the type usually employed in hot-pressing work.

A cast ring 23 partially embraces a flange on the upper end of the head portion, and is maintained in position by a plate 24 suitably secured thereto, as by bolts 25. The assembly comprising ring 23 and plate 24 is somewhat loose upon the flange, so that relative rotation with respect to the head portion is possible. A thrust washer 26, of chromium plated steel, may be interposed between the cooperating faces of the flange and ring 23 to reduce the friction therebetween.

A laterally extending arm 27 is secured to the casting 23 in any desired manner, as by a stud 28, and has the free end thereof in engagement with a suitable stationary member (not shown), to prevent rotation of the assemblies 23 and 24 when the head is rotated by means of the shaft 22, and at the same time, permit the head with the shaft 22 to reciprocate vertically.

In using the structure thus far described, a quantity of plastic porcelain clay, or other dielectric material to be molded, sufficient to form the blank shown in Fig. 7, is placed in the lower mold section 1. The upper mold section 10 is then placed in operative position with the pins 13 inserted in the sockets 3, so that relative axial movement of the two mold sections is prevented.

The rotatable die 20 is then lowered, while it is rotating, into the upper end of section 10 and as it engages the clay it will force it into intimate contact with the side walls of the recess 2 in section 1 and the side walls of the recess in the mold section 10 including the recesses 15 for forming the insulator lugs. This action may be facilitated by providing one or more flat areas on the head, or by having the surface of the head slightly eccentric with respect to the axis of rotation.

As the die descends, and before it reaches its lowest position, as in Fig. 1, the clay being forced upwardly into the upper mold section 10, tends to cause the mold section 10 to rise out of its operative position on the mold section 1. Upward movement is limited, however, by the plungers 16, which, as the die descends, are engaged by the under surface of the ring 23 to exert a pressure on the mold section 10 to prevent separation of the mold sections by more than a slight amount. Before the rotating die descends to its lowest position, therefore, the mold section 10 floats slightly above the section 1, but is guided in an axial direction by the pins 13 and sleeves 3, thereby permitting some of the plastic material to escape between the mold sections to insure that the space below ring 14 is completely filled.

By reason of the fact that the ring 23 does not rotate with the head of the die, the only force applied to the mold section 10 through the plungers 16 will be in a direction parallel to the axis of the die. Accordingly, there will be no tendency for the mold section 10 to rotate with respect to section 1.

The descending die continues its movement until the plungers 16 are completely depressed, and upon further movement of the die, the mold section 10 is positively depressed to the position shown in Fig. 1, the configuration of the die head and tip 21 determining the inner surface of the resulting insulator blank. As previously noted, during this operation air entrapped in the recesses 15 in the mold section 10 may be permitted to escape through the vents 19, air accumulating adjacent to the top of the blank may escape through vents 29 formed in the head of the die (Figs. 1 and 3), and air may escape through the vents adjacent to the periphery of ring 14.

It has been found in practice that with the apparatus described the resulting insulator blank is of uniform density and all depressions in the mold sections are completely filled. As the rotating die descends, the flattened surfaces on it tend to beat the plastic mass, or clay, and force it outwardly against the side walls of the mold sections. At the same time the spreading action of the clay mass causes the mold section 10 to rise slightly against the force of the spring-plungers 16 so that some of the clay may escape between the sections. As the die descends there is an increasing resilient pressure on mold section 10, and as the die approaches its downward limit of movement, the mold section 10 is rammed positively into position to exert a substantial pressure on the clay, completely filling all parts of the mold and, in fact, causing some of it to escape through the various vents.

Upon completion of the operation described, the rotating die is withdrawn vertically and, in order to relieve the suction occasioned by such withdrawal to prevent marring the inner surface of the insulator, a check valve is provided in the tip 21. This is shown in detail in Fig. 1, as comprising a valve head 30 seated in the lower extremity of the tip 21, having a stem 31 and a spring 32 normally biasing the valve to closed position. As the die rises and a condition of vacuum occurs adjacent the tip 21, the valve 30 moves downwardly from the position shown in Fig. 1 to permit the entrance of air to break the vacuum. A suitable vent 33 is provided in the shaft 22 to facilitate this action.

After withdrawal of the rotating die, the mold section 10 is removed, and as it is raised the ring 14 separates sufficiently to permit air to enter to break any vacuum that may exist adjacent to the inner periphery of the ring 14.

When the insulator blank has dried sufficiently to permit handling, it is removed from the mold section 1 and mounted on a lathe and trimmed to the shape shown in full lines in Fig. 2. Suitable holes 35, 36, 37 and 38 are drilled or punched for mounting the necessary hardware and electrical fittings to the insulator. The insulator is then fired and is ready for use.

It should be apparent from the foregoing description that the present invention is an improvement over the prior art in that it permits the forming of integral lugs on the exterior surface of an insulator coincident with the hot-pressing of the body portion thereof. It should also be apparent that the apparatus employed is simpler, both in structure and required manipulation, than that shown in my prior patent, above referred to. Quite obviously, however, modifications may be made in the structure herein disclosed without departing from the spirit of the present invention. Although I have shown a device for molding, or hot-pressing, an insulator of a particular shape, the mold sections 1 and 10 may be of any desired configuration to form insulators of non-symmetrical or irregular external contour having projections or lugs of any desired size or shape.

I claim as my invention:

1. Apparatus for molding insulators comprising a stationary mold section having a recess corresponding to a portion of the exterior shape of the insulator and a plane upper surface surrounding said recess, a second mold section of substantially cylindrical shape having an inner configuration corresponding to the remainder of the exterior shape of the insulator, means for maintaining said sections in superimposed axial alignment, a rotatable die having a shape corresponding to the inner shape of the insulator and means for moving it axially of said mold sections, and means operative upon movement of said die into the mold sections for pressing said sections together to maintain them in operative engagement.

2. Apparatus for molding insulators comprising a stationary mold section having a recess corresponding to a portion of the exterior shape of the insulator and a plane upper surface surrounding said recess, a second mold section of substantially cylindrical shape having an inner configuration corresponding to the remainder of the exterior shape of the insulator, means for maintaining said sections in superimposed axial alignment, a rotatable die having a shape corresponding to the inner shape of the insulator and means for moving it axially of said mold sections, and cooperating means carried by said rotatable die and disposed on said upper mold section for pressing said mold sections together to maintain them in operative engagement.

3. Apparatus for molding insulators comprising a stationary mold section having a recess corresponding to a porton of the exterior shape of the insulator and a plane upper surface surrounding said recess, a second mold section of substantially cylindrical shape having an inner configuration corresponding to the remainder of the exterior shape of the insulator, means for maintaining said sections in superimposed axial alignment, a rotatable die having a shape corresponding to the inner shape of the insulator and means for moving it axially of said mold sections, a flange carried by said rotatable die and means for preventing rotation thereof, and resilient means carried by the upper mold section disposed to be engaged by said flange for exerting a resilient pressure on said mold sections in a direction parallel to the axes thereof upon movement of said die into the mold sections.

4. A mold for forming insulators comprising two stationary mold sections in superimposed axial alignment defining a recess corresponding to the desired exterior shape of an insualtor, a rotatable die and means for moving it axially of said stationary sections to form the inner surface of said insulator, and means carried by said die for exerting a pressure on the upper of said mold sections in a direction parallel to the axis thereof to maintain said sections in operative relation as the die enters the mold sections.

5. A mold for forming insulators comprising two stationary mold sections in superimposed axial alignment defining a recess corresponding to the desired exterior shape of an insulator, a rotatable die and means for moving it axially of said stationary sections to form the inner surface of said insulator, and means carried by said die for exerting a pressure on the upper of said mold sections in a direction parallel to the axis thereof to maintain said sections in operative relation as the die enters the mold sections, said means including a non-rotatable flange carried by said die, and resilient means projecting from said upper mold section in a position to engage said flange.

6. A mold for forming insulators comprising two stationary mold sections in superimposed axial alignment defining a recess corresponding to the desired exterior shape of an insulator, a rotatable die and means for moving it axially of said stationary sections to form the inner surface of said insulator, and means carried by said die for exerting a pressure on the upper of said mold sections in a direction parallel to the axis thereof to maintain said sections in operative relation as the die enters the mold sections, said means comprising a flange carried by said rotatable die, means for preventing rotation of said flange, and a plurality of spring-biased plungers projecting above the upper face of the upper mold section in a position to engage said flange as the die descends into the mold sections.

7. A mold for forming insulators comprising a lower stationary mold section of moisture absorbent material having a recess therein for receiving the molding material and a plane bearing surface surrounding said recess, an upper mold section of metallic material having a flange adapted to rest upon said plane bearing surface of the lower section and having an opening therethrough in axial alignment with said recess, a plurality of guide pins projecting from said flange, sockets in said plane bearing surface for receiving said pins comprising metallic sleeves embedded in said lower section with the upper ends thereof substantially flush with said surface, and means below said surface for anchoring said sleeves in operative position.

8. A mold for forming insulators comprising a lower stationary mold section of moisture absorbent material having a recess therein for receiving the molding material and a plane bearing surface surrounding said recess, an upper mold section of metallic material having a flange adapted to rest upon said plane bearing surface of the lower section and having an opening therethrough in axial alignment with said recess, a plurality of guide pins projecting from said flange, sockets in said plane bearing surface for receiving said pins comprising metallic sleeves embedded in said lower section with the upper ends thereof substantially flush with said surface and means below said surface for anchoring said sleeves in operative position, a rotatable means for insertion into said mold sections for forcing the molding material into contact with the walls of such section, and means carried by said rotatable means for exerting pressure on said sections only in a direction parallel to the axis thereof.

9. In combination, two superimposed separable mold sections defining a recess for the reception of material to be molded, means for maintaining said sections in axial alignment, a rotatable die proportioned to extend into said recess and having a portion thereof proportioned to close said recess when the die approaches its inner limit of travel, and means carried by said die for cooperation with the upper of said mold sections for exerting a pressure thereon in the direction of movement of the die to prevent separation of the sections as the molding material is compressed.

10. Apparatus for molding insulators comprising a stationary mold section having a recess corresponding to a portion of the exterior shape of the insulator and a plane upper surface surrounding said recess, a second mold section of substantially cylindrical shape having an inner configuration corresponding to the remainder of the exterior shape of the insulator, means for maintaining said sections in superimposed axial alignment, a rotatable die having a shape corresponding to the inner shape of the insulator and means for moving it axially of said mold sections, and means operative upon movement of said die into the mold sections for pressing said sections with an increasing pressure as the die descends together to maintain them in operative engagement.

EUGENE H. FISCHER.